United States Patent [19]

Kenworthy

[11] 4,107,699
[45] Aug. 15, 1978

[54] TRENCHED STIMULATING PLATE

[75] Inventor: E. J. Doyle Kenworthy, Dayton, Ohio

[73] Assignee: The Mead Corporation, Dayton, Ohio

[21] Appl. No.: 824,425

[22] Filed: Aug. 15, 1977

[51] Int. Cl.² ........................................ G01D 15/18
[52] U.S. Cl. .................................................. 346/75
[58] Field of Search ........................................ 346/75

[56] References Cited

U.S. PATENT DOCUMENTS

| 3,580,515 | 5/1971 | Cassill | 346/75 X |
| 3,645,448 | 2/1972 | Houser | 346/75 X |
| 3,882,508 | 5/1975 | Stoneburner | 346/75 |

OTHER PUBLICATIONS

Bassous, E., High Density of Small Uniform Holes Etched Through a Thick Substrate of (110) Silicon, Nov. 1976, vol. 19, No. 6, pp. 2251–2252.

Bassous, E. et al., Fabricating Long Arrays of Nozzles in Large Diameter Wafers, Nov. 1976, vol. 19, No. 6, pp. 2311–2312.

Primary Examiner—George H. Miller, Jr.

[57] ABSTRACT

The stimulating plate in a jet drop recording head has a central, thin, flexible portion forming a medial channel or trench. The thicker portions of the plate which surround the trench form an acoustical barrier along its sides. When the thinner medial portion of the plate is acoustically stimulated, the energy is reflected and confined within the trench independently of the bond between the stimulating plate and the jet drop recording head.

9 Claims, 4 Drawing Figures

TRENCHED STIMULATING PLATE

BACKGROUND OF THE INVENTION

This invention relates generally to the field of jet drop recording, and more particularly to a stimulating plate for use in jet drop recorders such as shown in U.S. Pat. No. 3,882,508 and U.S. application Ser. No. 828,274, filed Aug. 29, 1977, both assigned to the assignee of the present invention.

As discussed in the aove '508 patent, the ink jets may be stimulated for controlled break-up into discrete droplets by applying suitable acoustical energy to the orifice plate itself. The orifice plate is bound to a plate holder which has an elongated opening which decreases in width with distance from the point where the orifice plate is stimulated. When the orifice plate is properly bonded to the orifice plate holder, the acoustical energy tends to be confined within the opening, due to the effective greater mass of the orifice plate holder along the edges of the opening. The narrowing of the opening is calculated to offset the attenuation of the acoustical energy so that the amplitude remains constant for uniform stimulation of the ink jets.

Alternatively, the body of ink within the recording head may be stimulated. This may be done, for example, by direct fluid coupling from a pressure plate opposite the orifice plate, as disclosed in the above '274 application. Again, the acoustical energy is most effectively utilized when it is confined to the region of the stimulating plate which is in contact with the body of ink.

As will be appreciated, the above configurations are sensitive to the nature and quality of the bond between the stimulating plate and the balance of the ink jet recording head. If the bond is irregular or weak, acoustical energy will be lost through the interface. This can also generate undesired reflections and otherwise interfere with the proper stimulation of the ink jets. Further, direct stimulation of the bond can fatigue and weaken it.

A need thus remains for a structure which separates the acoustical energy from the bond, and which contains the acoustic energy within the stimulating plate independently of, and substantially unaffected by, the bond between the stimulating plate and the balance of the ink drop recording head.

SUMMARY OF THE INVENTION

Briefly, the present invention meets the above needs and purposes by providing a stimulating plate having a flexible channel or trench along the length thereof, and in which the portions of the plate on either side of the channel form longitudinally continuous, thicker, and thus stiffer and more massive peripheral portions. The rather abrupt change in mass and stiffness between the thinner, medial portion of the plate and the thicker portions of the plate on the sides of the channel forms an acoustical barrier which reflects and confines the acoustical energy within the channel. The plate is then bound to the manifold of the recording head at the outer, thicker side portions of the plate. Since the acoustical energy is confined within the channel, the energy and the bond are effectively separated from one another.

It is therefore an object of the present invention to provide an improved stimulating plate for use in an ink jet drop recording head; a stimulating plate having a flexible, medial channel or trench extending along the length thereof; in which the portions of the plate on either side of the channel form longitudinally continuous, thicker, and thus stiffer and more massive peripheral portions; in which the stiffer and more massive peripheral portions form an acoustical barrier which confines acoustical energy to the thinner medial portion of the plate; in which the acoustical energy is thus confined within the channel independent of, and substantially unaffected by, the bond between the stimulating plate and the recording head; and to accomplish the above objects and purposes in an uncomplicated, inexpensive, versatile and reliable configuration readily suited for use in a wide variety of ink jet drop recording applications and configurations.

Other objects and advantages of the invention will be apparent from the following description, the accompanying drawings and the appended claims.

DESCRIPTION OF THE PREFERRED EMBODIMENT

Figure 1:
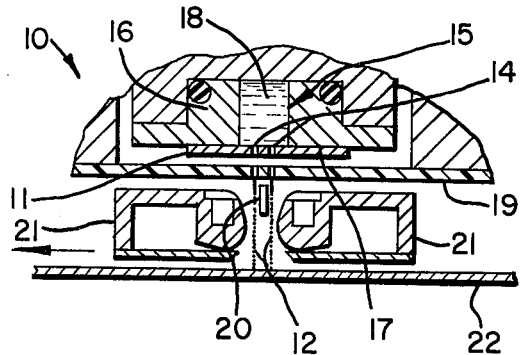
FIG. 1 illustrates a prior art jet drop recording head.

The jet drop recording head 10 illustrated in FIG. 1 is substantially the same as shown in U.S. Pat. No. 3,882,508. It contains an elongated orifice plate 11 stimulated by a stimulator (not shown) to create uniform droplets 12 of recording liquid. The droplets are created by causing a series of bending waves to travel lengthwise along the plate to stimulate jets of recording liquid which issue under sufficient pressure through orifices 14 arranged along a pair of lines in the orifice plate 11. The jets are forced through the orifices 14 from a common pressurized manifold 15 which connects with the orifices and is filled with the recording liquid. The manifold is defined in part by an orifice plate holder 16, and in part by the orifice plate 11 which is marginally secured or bonded at 17 to the orifice plate holder 16.

The recording liquid, such as ink, may be supplied to the manifold under pressure by a pump (not shown), and as the liquid jets are forced under pressure through the orifices 14, they may either be stimulated to break into the streams of regularly formed drops by directly stimulating the orifice plate itself, as shown in the '508 patent, or by stimulating the body of recording fluid 18 in manifold 15 by direct fluid coupling. The latter may be done, for example, by means of a pressure plate such as disclosed in U.S. application Ser. No. 828,274, filed Aug. 29, 1977. In either case, the drops which are formed are charged by a charge ring plate 19, and a deflection strip 20 causes them to pass or be deflected selectively either to catchers 21 or to a traveling web, such as a web of paper 22, to create intelligible patterns therefrom.

Figure 2:
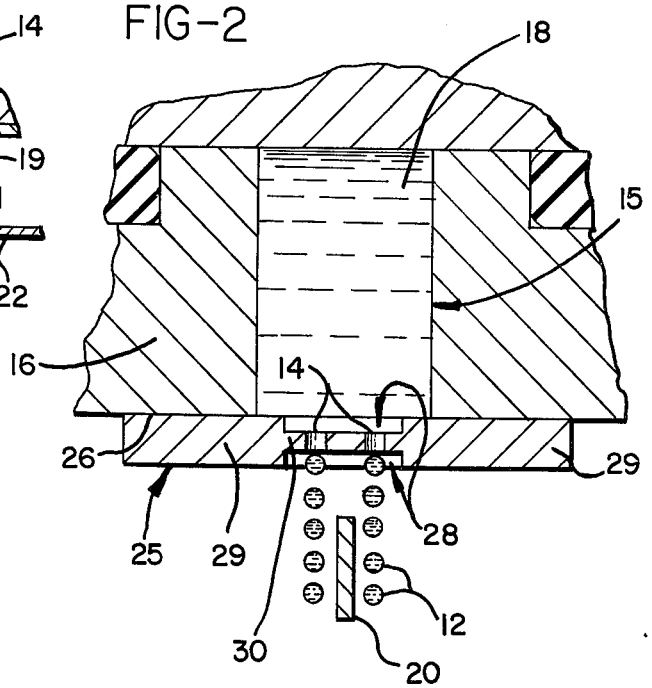
FIG. 2 is a cross sectional view of a jet drop recording head similar to that of FIG. 1, but in which the orifice plate is a stimulating plate according to the present invention.

FIG. 2 illustrates a modification of the FIG. 1 recording head according to the present invention (with portions of the head omitted for clarity of illustration), wherein a trenched orifice plate 25 is employed. More particularly, plate 25 is an elongated plate (FIG. 3) secured or bonded at 26 by any suitable means to orifice plate holder 16. Plate 25 forms a part of the wall of the manifold 15 and is directly in contact with the recording liquid 18 within the manifold. A thin, flexible and acoustically conductive medial channel or trench 28 extends along the length of plate 25, and the thicker edge portions 29 of plate 25 on either side of the channel or trench 28 form longitudinally continuous, thicker, and thus stiffer and more massive peripheral portions. The trench may be on either side of the plate, or "divided" between the bottom and top sides, as illustrated. It will be understood that as used herein it is intended to cover all such variations.

The thicker and stiffer edge portions 29 form an acoustical barrier between the thinner medial portion 30 of the plate 25, at the bottom of trench 28, and the greater masses of the edge portions 29 on the sides of the channel or trench 28. The thinner medial portion 30 is then acoustically stimulated in known fashion, such as at stimulation point 32, to cause a series of bending waves to travel lengthwise along channel 28 for stimulating the jets. The smooth and continuous acoustical barrier at the sides of the channel reflects and confines the acoustical energy within the channel independently of and substantially unaffected by, the interface or bond 26 between the orifice plate 25 and the remainder of the manifold 15.

Figure 3:
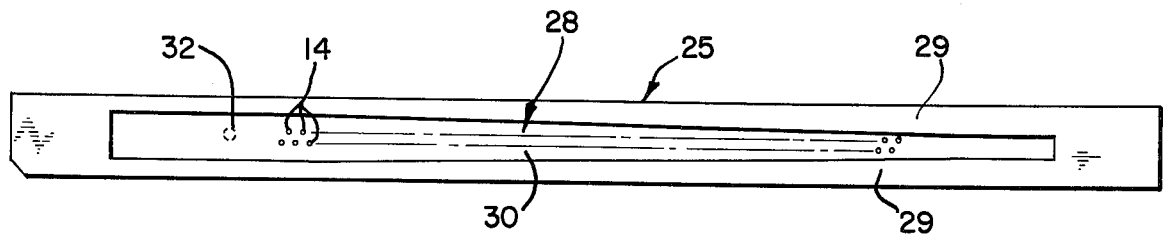
FIG. 3 is a plan view of the plate shown in FIG. 2.

In one embodiment, the thinner medial portion 30 has a thickness of approximately 0.006 inch, and the thicker edge portions 29 a thickness of 0.020 inch. The channel or trnech 28 is tapered in width along its length, in known fashion, from a width of approximately 0.270 inch at the orifice 14 nearest stimulation point 32, to a width of 0.140 inch at the orifice most remote from point 32 (FIG. 3). The trench itself may be formed by any suitable technique, such as etching, photofabrication, plating, and so on.

Figure 4:
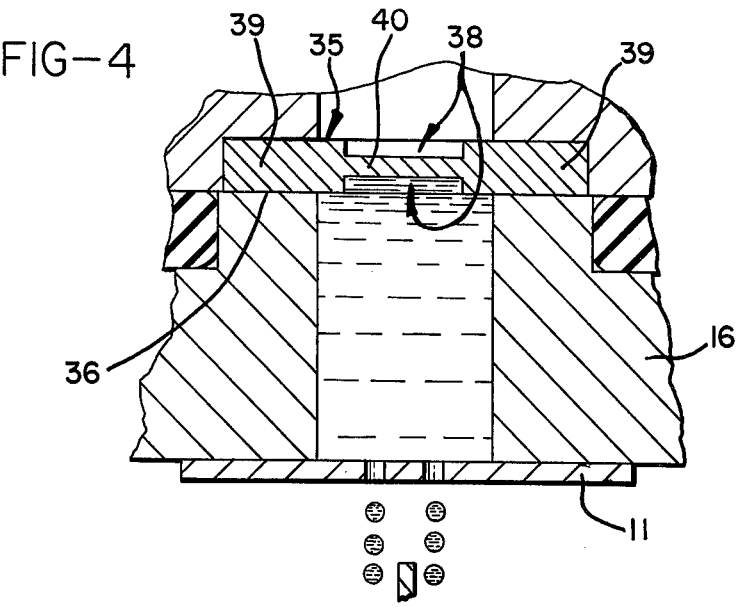
FIG. 4 is a cross sectional view showing a modification in which a stimulating pressure plate is used according to the present invention.

In the FIG. 4 embodiment, a trenched pressure plate 35 serves as the stimulating plate rather than the trenched orifice plate 25 in FIG. 2. The FIG. 4 embodiment thus uses an orifice plate such as orifice plate 11 (FIG. 1). In accordance with the principles just discussed with respect to the trenched orifice plate 25, pressure plate 35 is similarly secured at 36 to the orifice plate holder 16, substantially opposite orifice plate 11 on the other side of manifold 15. Plate 35, which thus forms a portion of the manifold, has a flexible medial channel or trench 38 having thicker edge portions 39 on either side thereof and a thinner medial portion 40. Plate 35 is then acoustically stimulated and the acoustical energy is reflected and confined therein independently of the interface 36 between plate 35 and holder 16. The acoustical vibrations in the thinner medial portion 40 stimulate the body of recording fluid 18 with which it is in contact, and this is turn stimulates the jet of fluid issuing through the orifices 14 in plate 11.

As may be seen, therefore, the present invention provides numerous advantages. Principally, the acoustical energy is confined within the trenched region of the stimulating plate independently of, and substantially unaffected by, the interface between the stimulating plate and the manifold. The stimulating plate may be located wherever suitable. It may be combined with the orifice plate into a single structure, as illustrated in FIG. 2, or it may be used as a pressure plate for direct fluid coupling at some other location in the manifold, as illustrated in FIG. 4. In all such cases, however, the stimulating plate contains the acoustical energy within its own, integral trenched region, so that confinement of the energy is not dependent upon, and does not affect, mechanical circumstances outside the stimulating plate itself. Thus, the interface between the stimulating plate and the manifold does not interact with the acoustical stimulation, and is not affected thereby. Substantial improvements may thereby be realized, since suitable, fluid tight bonds may be used without concern about their affect upon the acoustical energy, nor about the affect of the acoustical energy on them.

While the form of apparatus herein described constitutes a preferred embodiment of this invention, it is to be understood that the invention is not limited to this precise form of apparatus, and that changes may be made therein without departing from the scope of the invention.

What is claimed is:

1. In a jet drop recording head comprising an orifice plate provided with a plurality of orifices, a common manifold connecting with the orifices, means marginally securing the orifice plate to the manifold, means for supplying a recording liquid to the manifold at sufficient pressure for forcing the liquid through the orifices and creating a plurality of liquid jets, means for stimulating the jets to break up into streams of regularly formed drops, and means for charging and deflecting the drops to create intelligible patterns therefrom; the improvement wherein the means for stimulating the jets comprises an elongated stimulating plate secured to and forming a part of the wall of the manifold for directly contacting recording liquid in the manifold, means forming a flexible medial channel or trench in said stimulating plate and extending along the length thereof, the portions of said plate on either side of said channel forming longitudinally continuous, thicker, stiffer and more massive peripheral portions, thereby forming an acoustical barrier between the thinner medial portion of said plate and the greater, more rigid masses of the portions of said plate on the sides of said channel, and means for acoustically stimulating the thinner medial portion of said plate and thereby stimulating the jets, the acoustical barrier at the sides of the channel reflecting and confining the acoustical energy within said channel independently of, and substantially unaffected by, the interface between said stimulating plate and said manifold.

2. The improvement of claim 1 wherein said stimulating plate is also the orifice plate.

3. The improvement of claim 2 wherein the orifices are located and spaced in and along said trench.

4. The improvement of claim 1 wherein said stimulating plate is a pressure plate positioned substantially opposite the orifice plate on the other side of the manifold therefrom.

5. The improvement of claim 1 wherein said means for acoustically stimulating said plate further comprises means for causing a series of bending waves to travel lengthwise along said channel for stimulating the jets.

6. An orifice plate for a jet drop recording head comprising:
(a) an elongated orifice plate,
(b) means forming a flexible medial channel or trench in said orifice plate and extending along the length thereof, the portions of said plate on either side of said channel forming longitudinally continuous, thicker, stiffer and more massive peripheral portions, thereby forming an acoustical barrier between the thinner medial portion of said plate and the greater masses of the portions of said plate on the sides of said channel, and (c) means forming a plurality of orifices arranged along at least a line in and along said trench in said orifice plate.

7. The improvement of claim 6 further comprising means forming at least one acoustical stimulation point in said trench, and wherein said trench is tapered in width along is length from said stimulation point to offset attenuation of acoustical energy in said trench to keep the amplitude thereof constant for uniform stimulation of the ink jets.

8. An orifice plate for a jet drop recording head comprising a marginal portion and a medial portion along which is arranged a row of regularly spaced orifices, characterized in that said marginal portion is rigid and in that said medial portion is a thin, flexible and acoustically conductive region defined by an elongated trench extending medially along the length of said plate.

9. An orifice plate according to claim 8 characterized in that the width of said trench decreases progressively from point to point therealong for compensating against acoustical wave attenuation.

* * * * *